United States Patent
Kim (10) Patent No.: US 10,304,312 B2
(45) Date of Patent: May 28, 2019

(54) IMAGING APPARATUS, IMAGING SYSTEM, TARGET PERSON MONITORING SYSTEM AND CONTROL METHOD OF IMAGING APPARATUS

(71) Applicant: KYOCERA Corporation, Kyoto-shi, Kyoto (JP)

(72) Inventor: Woojung Kim, Yokosuka (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/771,753

(22) PCT Filed: Oct. 24, 2016

(86) PCT No.: PCT/JP2016/004677
§ 371 (c)(1),
(2) Date: Apr. 27, 2018

(87) PCT Pub. No.: WO2017/073045
PCT Pub. Date: May 4, 2017

(65) Prior Publication Data
US 2018/0315288 A1 Nov. 1, 2018

(30) Foreign Application Priority Data
Oct. 28, 2015 (JP) .................. 2015-212223

(51) Int. Cl.
*G08B 23/00* (2006.01)
*G08B 21/06* (2006.01)
(Continued)

(52) U.S. Cl.
CPC ............. *G08B 21/06* (2013.01); *G03B 15/00* (2013.01); *G03B 15/03* (2013.01); *G03B 15/05* (2013.01);
(Continued)

(58) Field of Classification Search
CPC .... G08B 21/06; G06F 3/013; G06K 9/00255; G06K 9/00604; H04N 5/2256;
(Continued)

(56) References Cited

U.S. PATENT DOCUMENTS 5,528,698 A * 6/1996 Kamei .................. B60N 2/002
250/227.15
6,049,747 A * 4/2000 Nakajima .............. B60N 2/002
340/576
(Continued)

FOREIGN PATENT DOCUMENTS

| JP | 2006-248363 A | 9/2006 |
|---|---|---|
| JP | 2013-172261 A | 9/2013 |
| WO | 2015/031942 A1 | 3/2015 |

*Primary Examiner* — Kerri L McNally
*Assistant Examiner* — Thang D Tran
(74) *Attorney, Agent, or Firm* — Procopio Cory Hargreaves and Savitch LLP (57) ABSTRACT

The imaging apparatus comprises an image sensor and a controller. In the image sensor, charge accumulation and reading out in a plurality of pixels arranged in a two-dimensional array are controlled per line. The controller identifies one or more lines from lines of the image sensor to generate control information for controlling illumination light on the basis of the one or more lines identified.

7 Claims, 7 Drawing Sheets

(51) Int. Cl.
  *G03B 15/00* (2006.01)
  *G03B 15/03* (2006.01)
  *G03B 15/05* (2006.01)
  *G03B 17/02* (2006.01)
  *H04N 5/225* (2006.01)
  *H04N 5/232* (2006.01)
  *H04N 5/238* (2006.01)
  *G06F 3/01* (2006.01)
  *G06K 9/00* (2006.01)

(52) U.S. Cl.
  CPC ............ *G03B 17/02* (2013.01); *G06F 3/013* (2013.01); *G06K 9/00255* (2013.01); *G06K 9/00604* (2013.01); *H04N 5/225* (2013.01); *H04N 5/2256* (2013.01); *H04N 5/232* (2013.01); *H04N 5/238* (2013.01); *H04N 5/23241* (2013.01)

(58) Field of Classification Search
  CPC .... H04N 5/23241; H04N 5/225; H04N 5/232; H04N 5/238; G03B 15/00; G03B 15/03; G03B 15/05; G03B 17/02
  USPC .......................................................... 340/576
  See application file for complete search history.

(56) References Cited

U.S. PATENT DOCUMENTS

| | | | | |
|---|---|---|---|---|
| 6,304,187 B1* | 10/2001 | Pirim | ................ | B60R 1/04 340/573.1 |
| 6,864,916 B1* | 3/2005 | Nayar | ................ | H04N 5/2355 348/224.1 |
| 7,027,054 B1* | 4/2006 | Cheiky | ................ | G06T 13/40 345/473 |
| 7,551,987 B2 | 6/2009 | Ota | | |
| 2001/0052939 A1* | 12/2001 | Riedel | ................ | G06T 1/00 348/294 |
| 2002/0149679 A1* | 10/2002 | Deangelis | ........ | A63B 24/0003 348/207.99 |
| 2002/0158977 A1* | 10/2002 | Hamilton, Jr. | ....... | H04N 5/2176 348/246 |
| 2002/0181743 A1* | 12/2002 | Khairallah | ........ | B60R 21/01538 382/104 |
| 2004/0090540 A2* | 5/2004 | Tay | ................ | H04N 1/32358 348/231.99 |
| 2005/0243195 A1* | 11/2005 | Parks | ................ | H04N 9/045 348/311 |
| 2006/0125943 A1* | 6/2006 | Parks | ................ | H04N 3/1562 348/311 |
| 2006/0212202 A1 | 9/2006 | Ota | | |
| 2007/0269200 A1* | 11/2007 | Rai | ................ | G03B 41/00 396/335 |
| 2008/0203277 A1* | 8/2008 | Warszauer | ........ | H04N 5/2256 250/208.1 |
| 2009/0096886 A1* | 4/2009 | Kusaka | ............ | H04N 5/23212 348/222.1 |
| 2011/0075008 A1* | 3/2011 | Border | ............ | H04N 5/235 348/317 |
| 2011/0122304 A1* | 5/2011 | Sedelnikov | ........ | H04N 5/2353 348/294 |
| 2012/0162484 A1* | 6/2012 | Mo | ................ | H04N 5/2176 348/241 |
| 2012/0188432 A1* | 7/2012 | Kubota | ............ | H04N 5/2352 348/333.01 |
| 2012/0236187 A1* | 9/2012 | Guthrie | ............ | H04N 5/3454 348/273 |
| 2013/0093788 A1* | 4/2013 | Liu | ................ | G06F 3/011 345/633 |
| 2013/0293752 A1* | 11/2013 | Peng | ................ | H04N 5/353 348/295 |
| 2013/0307951 A1* | 11/2013 | Ono | ................ | H04N 5/2354 348/68 |
| 2014/0078277 A1* | 3/2014 | Dai | ................ | A61B 1/00004 348/68 |
| 2015/0334371 A1* | 11/2015 | Galera | ............ | H04N 13/0203 348/46 |
| 2016/0088231 A1* | 3/2016 | Oku | ................ | H04N 5/2259 348/222.1 |
| 2016/0198091 A1* | 7/2016 | Edwards | ............ | G06F 3/013 348/78 |
| 2016/0323518 A1* | 11/2016 | Rivard | ............ | H04N 5/247 |
| 2017/0034402 A1* | 2/2017 | Kimura | ............ | H04N 5/0736 |

\* cited by examiner

IMAGING APPARATUS, IMAGING SYSTEM, TARGET PERSON MONITORING SYSTEM AND CONTROL METHOD OF IMAGING APPARATUS

CROSS-REFERENCE TO RELATED APPLICATION

This application claims priority from and the benefit of Japanese Patent Application No. 2015-212223 filed on Oct. 28, 2015, the entire contents of which are incorporated herein by reference.

TECHNICAL FIELD

This disclosure relates to an imaging apparatus, an imaging system and a target person monitoring system configured to monitor a state of a target person such as a vehicle driver, and a control method of the imaging apparatus.

BACKGROUND

A device that irradiates a target person such as a vehicle driver with infrared band light and monitors a state of the target person by using an image captured by an infrared camera to generate an alert to prevent drowsy driving has been known.

SUMMARY

An imaging apparatus according to an embodiment of this disclosure comprises an image sensor and a controller. In the image sensor, charge accumulation and reading out in a plurality of pixels arranged in a two-dimensional array are controlled per line. The controller identifies one or more lines from a plurality of lines of the image sensor and generates the control information for controlling illumination light on the basis of the one or more lines identified.

An imaging system according to an embodiment of this disclosure comprises one or more light sources, an image sensor and a controller. The one or more light sources emit illumination light. In the image sensor, charge accumulation and reading out in a plurality of pixels arranged in a two-dimensional array are controlled per line. The controller identifies one or more lines from a plurality of lines of the image sensor and generates the control information for controlling the illumination light on the basis of the one or more lines identified.

A target person monitoring system according to an embodiment of this disclosure comprises one or more light sources, an image sensor, a controller and a warning unit. The one or more light sources emit illumination light. In the image sensor, charge accumulation and reading out in a plurality of pixels arranged in a two-dimensional array are controlled per line. The controller identifies one or more lines from a plurality of lines of the image sensor and generates the control information for controlling the illumination light on the basis of the one or more lines identified. The controller determines a state of a target person on the basis of a captured image acquired from the image sensor. The warning unit issues a warning to the target person when the target person is determined to be in a specific state.

A control method of the imaging apparatus according to an embodiment of this disclosure is a control method of an imaging apparatus comprising an image sensor in which charge accumulation and reading out in a plurality of pixels arranged in a two-dimensional array are controlled per line. The control method of the imaging apparatus includes identifying one or more lines from a plurality of lines of the image sensor to generate the control information for controlling illumination light on the basis of the one or more lines identified.

DETAILED DESCRIPTION

Embodiments of this disclosure will be described below with reference to drawings.

A target person monitoring system 10 according to an embodiment of this disclosure is described with reference to FIG. 1. The target person monitoring system 10 comprises an imaging system 13 that includes an illumination apparatus 11 and an imaging apparatus 12 and a warning apparatus 14. Each component of the target person monitoring system 10 can transmit/receive the information over the network 15. The network 15 may include wireless network, wired network, Controller Area Network (CAN) and the like. A part or all of the components of the target person monitoring system 10 may be integral as one apparatus. For example, at least one of the illumination apparatus 11 and the warning apparatus 14 may be incorporated in the imaging apparatus 12.

Figure 2:
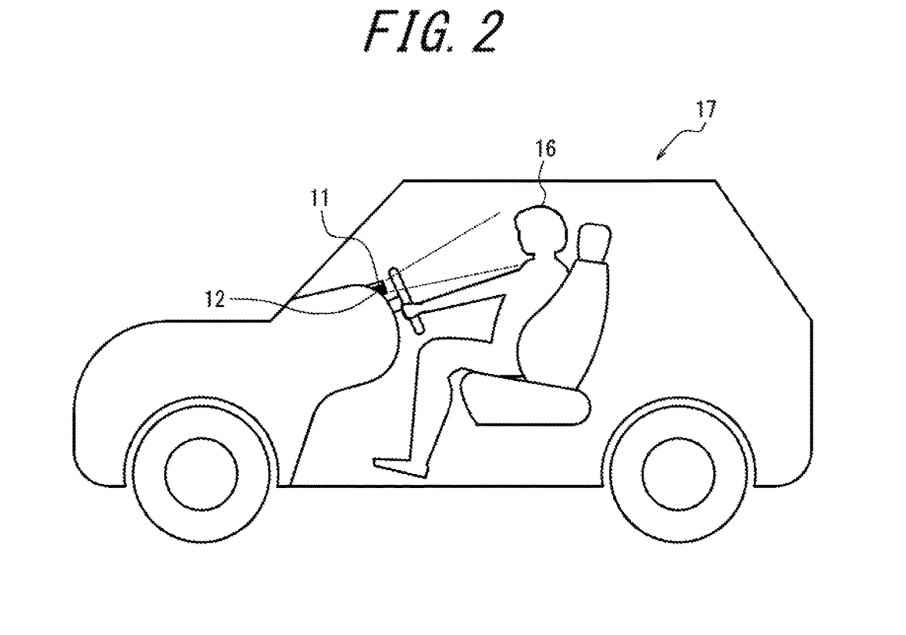
FIG. 2 is a schematic diagram illustrating a vehicle having the target person monitoring system in FIG. 1.

The illumination apparatus 11 is located on any place where it can irradiate a face of the target person 16 with light. The target person 16 may include a driver of a vehicle 17, for example. The illumination apparatus 11 is located in the vehicle 17, for example. As illustrated in FIG. 2, the illumination apparatus 11 is located on a dashboard in the vehicle 17, for example. The illumination apparatus 11 may be able to irradiate the entire image capturing range of the imaging apparatus 12 in the vehicle 17. Hereinafter the light emitted from the illumination apparatus 11 is also referred to as illumination light. The illumination light may be emitted continuously or by pulse. The illumination light may have or may not have directional characteristics.

The imaging apparatus 12 is located on any position where it can capture an image of a face of the target person 16. The imaging apparatus 12 is located in the vehicle 17, for example. As illustrated in FIG. 2, for example, the imaging apparatus 12 is located on the dashboard of the vehicle 17. The image capturing range of the imaging apparatus 12 may include an area in which a face of the target person 16 can exist.

The warning apparatus 14 gives a warning to the target person 16. The warning apparatus 14 may give a warning when it is highly probable that the target person 16 drives in an inattentive or a dozing manner, for example. When a warning is given with sound, for example, the warning apparatus 14 may be disposed on any position in the vehicle 17. For example, when a warning is given with vibration, the warning apparatus 14 may be disposed on any position where vibration is transmitted to the target person 16. For example, the warning apparatus 14 is disposed on a driver seat, a steering wheel, a shift knob, or a foot rest in the vehicle 17.

Each configuration of the target person monitoring system 10 is described.

The imaging apparatus 12 is described. As illustrated in FIG. 1, the imaging apparatus 12 comprises an imaging optical system 22, an image sensor 23, an imaging apparatus communication interface 24 and an imaging apparatus controller 25.

The imaging optical system 22 forms an object image. For example, the imaging optical system 22 may include an aperture and a plurality of lenses. The imaging optical system 22 allows at least light having a specific wavelength bandwidth to pass therethrough. The specific wavelength bandwidth may include wavelength of light emitted from the illumination apparatus 11. For example, when the light emitted from the illumination apparatus 11 includes infrared light, the specific wavelength bandwidth may be a bandwidth that includes a wavelength of the infrared light. The imaging optical system 22 may further include a filter that allows light having the specific wavelength bandwidth to pass therethrough, for example. The imaging optical system 22 is located on any position where it can receive the light reflected from an object that is irradiated with illumination light emitted from the illumination apparatus 11. The imaging optical system 22 forms an image of the object including a face of the target person 16 irradiated with illumination light.

The image sensor 23 comprises a plurality of pixels arranged in a two-dimensional array. The image sensor 23 may include Complementary Metal Oxide Semiconductor (CMOS) image sensor, for example. Charge accumulation and reading out in a plurality of pixels are controlled per line. For example, charge accumulation and reading out in a plurality of pixels may be controlled by an imaging apparatus controller 25. Control of charge accumulation and reading out is described in detail below. The image sensor 23 captures an object image formed by the imaging optical system 22 to generate a captured image. The image sensor 23 generates a captured image of the target person 16 in the vehicle 17.

The image sensor 23 may apply a specific pre-image processing to a captured image generated. The specific pre-image processing may include, for example, Correlated Double Sampling (CDS), Automatic Gain Control (AGC), Analog Digital Conversion (ADC) and the like.

The imaging apparatus communication interface 24 may include an interface configured to input/output the information over the network 15. Hereinafter the information input is also referred to as information acquisition or reception. The information output is also referred to as information transmission.

The imaging apparatus controller 25 includes one or more processors. The processor may include a dedicated processor specific to specific processing and a general purpose processor that reads specific program to execute a specific function. The dedicated processor may include Digital Signal Processor (DSP) and Application Specific Integrated Circuit (ASIC). The processor may include Programmable Logic Device (PLD). PLD may include Field-Programmable Gate Array (FPGA). The illumination apparatus controller 21 may be either System-on-a-Chip (SoC) in which one or more processors corporate with each other or System In a Package (SiP).

The imaging apparatus controller 25 controls the overall operation of the imaging apparatus 12.

Figure 3:
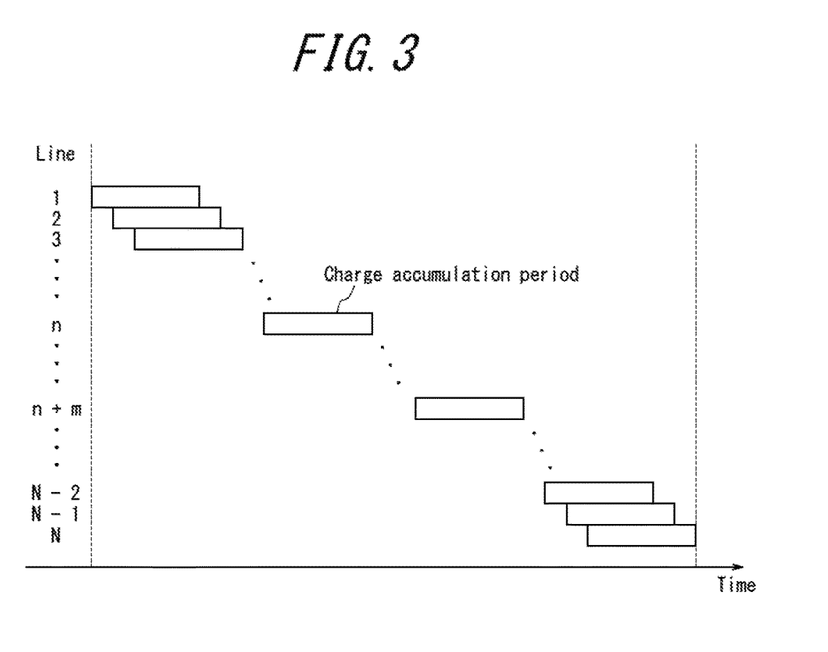
FIG. 3 is a diagram illustrating a charge accumulation period of each line in an image sensor.

The imaging apparatus controller 25 controls charge accumulation and reading out in a plurality of pixels arranged in a two-dimensional array of the image sensor 23 per line. For example, as illustrated in FIG. 3, the start timing and the end timing of a period of charge accumulation are different by each line. Hereinafter the period of charge accumulation is also referred to as a charge accumulation period. When the charge accumulation period ends, reading out of charge for corresponding line is performed. In one frame, a charge accumulation period length of each line may be the same. The start timing and the end timing of charge accumulation period of each line in each frame is not limited to the example illustrated in FIG. 3.

The imaging apparatus controller 25 may cause the image sensor 23 to generate a captured image at any frame rate. Suppose that the image sensor 23 comprises N pieces of lines, a captured image of one frame is generated on the basis of the charge that is read out once per line from the 1st line to the Nth lines. Therefore, the timing at which reading out of charge is executed at each line is determined by the frame rate. For example, when the frame rate is 60 fps, reading out of charge is performed 60 times per one second at each line from the 1 st to the Nth lines.

Figure 8:
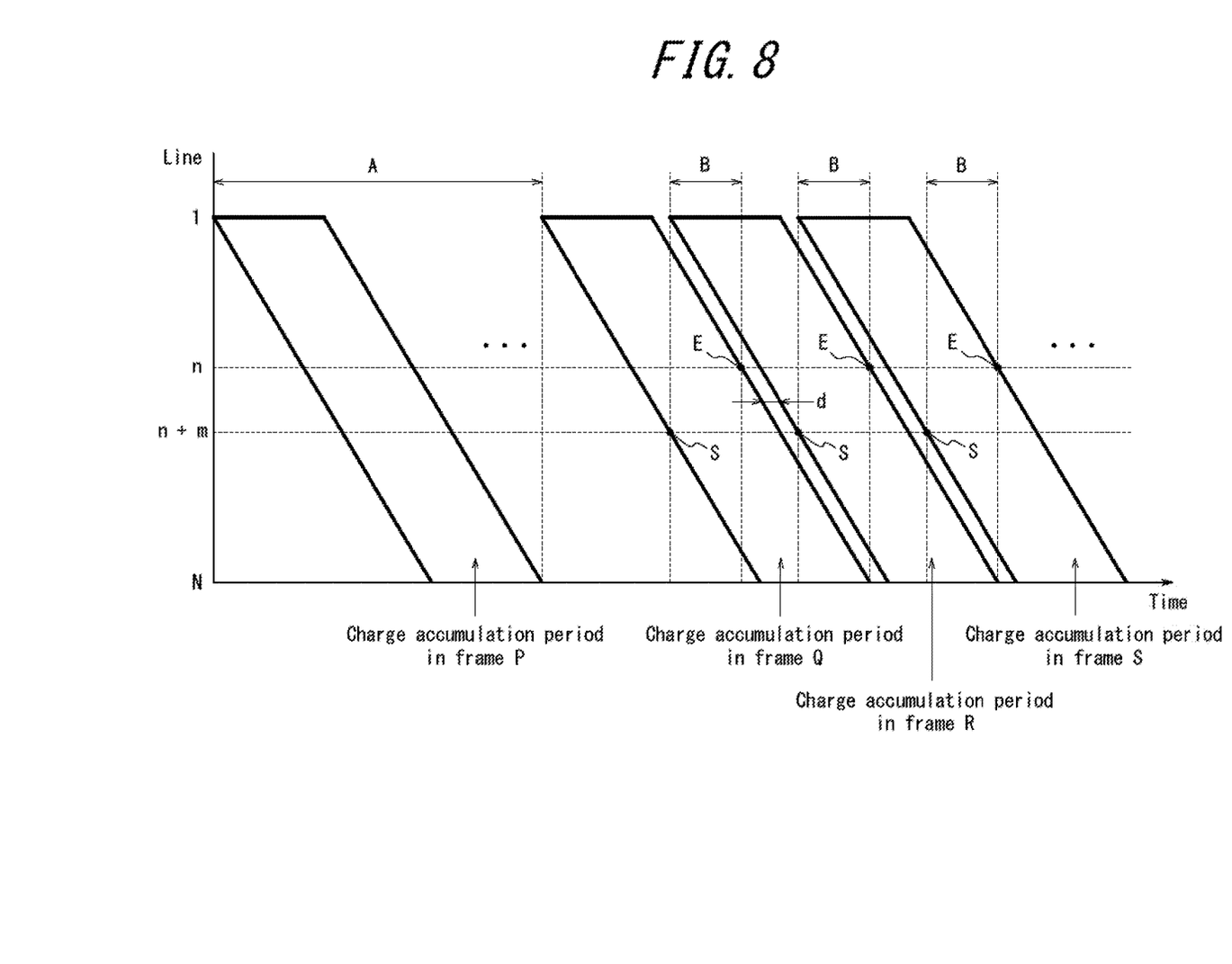
FIG. 8 is a diagram illustrating charge accumulation periods of a plurality of frames.

For example, as illustrated in FIG. 8, the next charge accumulation period may be started a predetermined time d after the end of reading out of charge in each line. The time d may be dynamically determined in exposure control performed by the imaging apparatus controller 25. The charge accumulation period is decreased as the time d is increased. The imaging apparatus controller 25 may set the time d to zero. In this case, a charge accumulation period of the next frame is started immediately after the end of the reading out of charge in each line.

The method of controlling charge accumulation and reading out in a plurality of pixels per line may include a rolling shutter method.

Figure 4:
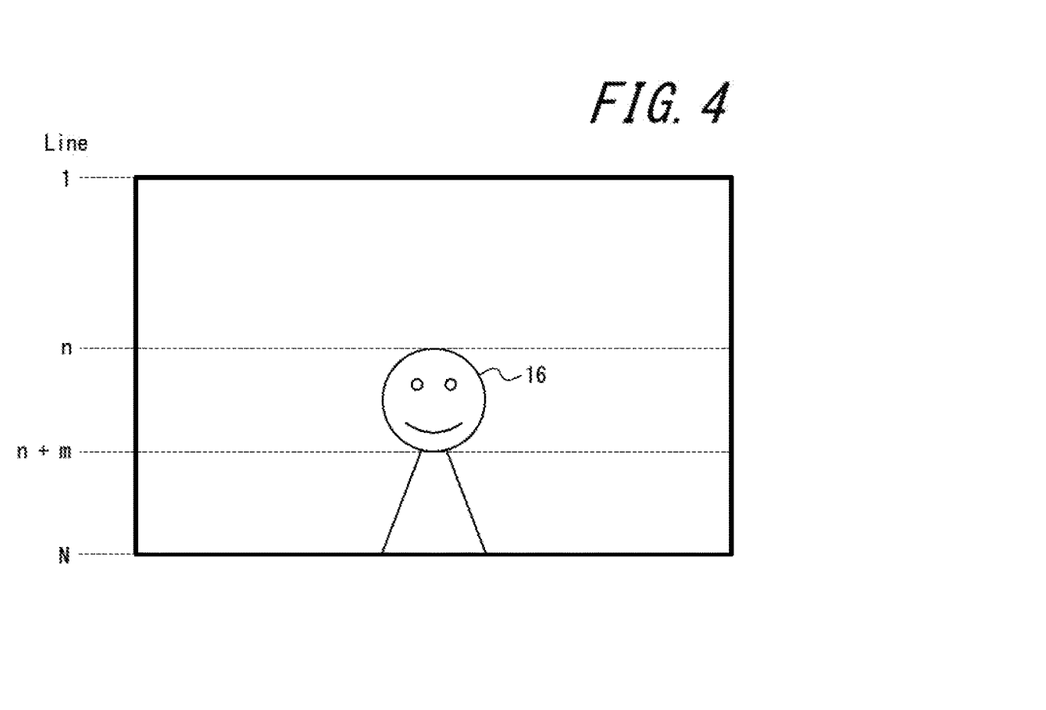
FIG. 4 is a diagram illustrating an image captured during a first operation of an illumination apparatus.

The imaging apparatus controller 25 generates the first control information for controlling the illumination light from the illumination apparatus 11. The first control information may include an instruction for causing the illumination apparatus 11 to emit illumination light. The imaging apparatus controller 25 transmits the first control information to the illumination apparatus 11. As described later, the illumination apparatus 11 receives the first control information and irradiates illumination light. For example, as illustrated in FIG. 8, the illumination light is irradiated over the period A from the start timing of charge accumulation period of the 1st line to the end timing of charge accumulation period of Nth line in frame P. In this case, as illustrated in FIG. 4, for example, a captured image of frame P has approximately uniform brightness in all lines. FIG. 4 illustrates an example of a captured image when the imaging apparatus 12 is disposed in the vehicle 17 such that each line is aligned in the approximately horizontal direction relative to the target person 16. Alternatively, the imaging apparatus 12 may be disposed in the vehicle 17 such that each line is aligned in the vertical direction relative to the target person 16.

The imaging apparatus controller 25 may apply a specific post-image processing to the captured image generated. The post-image processing may include exposure adjustment processing and extraction processing, for example. The extraction processing is described later.

The imaging apparatus controller 25 performs the object detection processing by using a captured image. A specific detection object can be detected by the object detection processing. The detection object may include eyes or pupils of the target person 16. The detection object may further include, for example, a face, a nose and a mouth of the target person 16. Any methods can be adopted as the object detection processing. For example, a method using a pattern matching or a method of extracting feature points on a captured image can be adopted. The imaging apparatus controller 25 may perform the object detection processing per any number of frames. For example, the imaging apparatus controller 25 may perform the object detection processing per each frame or per some frames.

When the detection object is detected by the object detection processing, the imaging apparatus controller 25 identifies one or more lines of the image sensor 23 corresponding to the area on the captured image that includes at least a detected detection object. As described above, a detection object includes eyes or pupils of the target person 16. The imaging apparatus controller 25 identifies one or more lines of the image sensor 23 corresponding to the area on the captured image that includes at least eyes or pupils of the target person 16. When a face of the target person 16 is further included in the detection object, the imaging apparatus controller 25 identifies the line corresponding to the area on the captured image including a face and eyes or pupils of the detected target person 16. For example, when the imaging apparatus controller 25 detects a face and eyes or pupils of the target person 16, which is a detection object, by using a captured image of frame P illustrated in FIG. 4, it may identify the lines from the nth to the n+mth that include the detection object.

The imaging apparatus controller 25 generates the second control information for controlling the illumination light from the illumination apparatus 11 on the basis of the identified one or more lines. The second control information may include the information indicating a specific period determined on the basis of the identified one or more lines.

The specific period and the second control information are described in detail. For example, the imaging apparatus controller 25 identifies the lines from the nth to the n+mth by using the aforementioned captured image of frame P. The imaging apparatus controller 25 may determine at least a part of the period from the first timing to the second timing in the frame after the frame of the captured image used for the object detection processing as a specific period. The first timing is the latest one of the start timings of charge accumulation period of the identified one or more lines. The second timing is the earliest one of the end timings of charge accumulation period of the identified one or more lines. For example, in the example illustrated in FIG. 8, the imaging apparatus controller 25 determines at least a part of the period B from the start timing S of the charge accumulation period of the n+mth line to the end timing E of the charge accumulation period of the nth line in each frame after frame P as a specific period.

The imaging apparatus controller 25 generates the second control information that includes the information indicating the determined specific period. The second control information may further include an instruction for emitting illumination light in a specific period. The second control information may further include an instruction for stopping emission of illumination light outside the specific period. When the illumination light is irradiated in the specific period, the area on the captured image corresponding from at least the nth line to the n+mth line has uniform brightness. The second control information may further include the information of controlling the brightness of the illumination light emitted in the specific period in each frame after frame P. For example, the imaging apparatus controller 25 may determine the brightness of the illumination light such that the area on the captured image corresponding to the nth line to the n+mth line will have brightness enough to detect a detection object by the object detection processing. The information for controlling the brightness of the illumination light may include parameters such as, for example, a duty ratio, which is the product of pulse width of a drive signal of the illumination apparatus 11 and frequency of the drive signal, a drive current value of the illumination apparatus 11 and the number of the light sources 18 for light emission.

Figure 5:
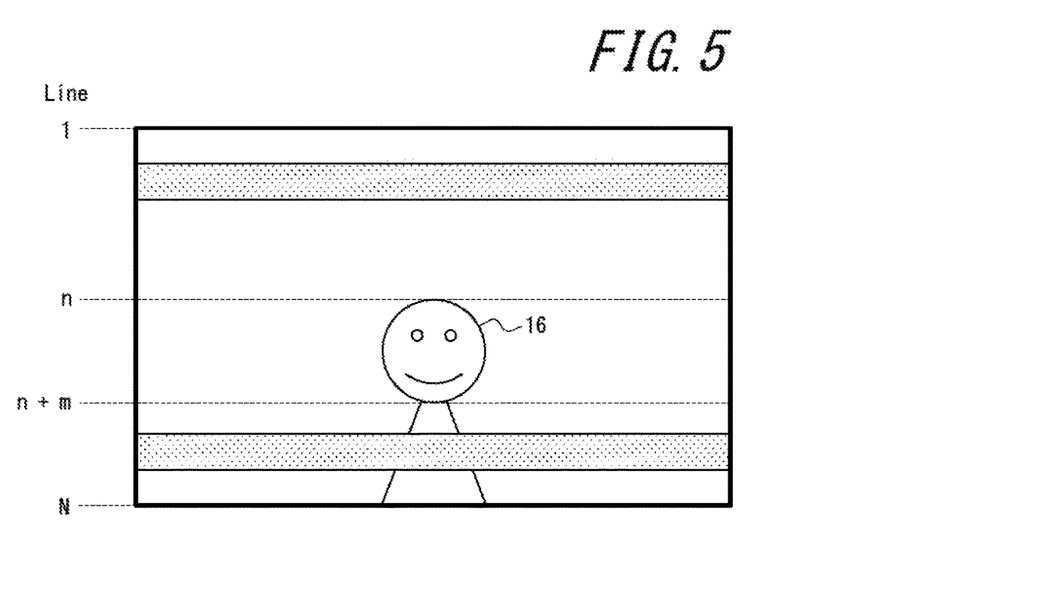
FIG. 5 is a diagram illustrating an image captured during a second operation of the illumination apparatus.

The imaging apparatus controller 25 transmits the second control information generated in the aforementioned manner to the illumination apparatus 11. The illumination apparatus 11 that receives the second control information irradiates illumination light in a specific period in respective frames Q, R and S after frame P, for example, illustrated in FIG. 8. Emission of the illumination light is stopped outside the specific period. For example, in the captured image in frame R, as illustrated in FIG. 5, the area on the captured image corresponding to at least the nth line to the n+mth line has approximately uniform brightness. The area on the captured image corresponding from the nth line to the n+mth line includes a face of the target person 16, which is a detection object, in the first frame, and thus it is highly probable that the area includes a face of the target person 16 also in the second frame. An area on a captured image corresponding to a part of the lines from the first line to the n−1th line may be darkened. An area on a captured image corresponding to a part of the lines from the n+m+1th line to the Nth line may be darkened.

Figure 6:
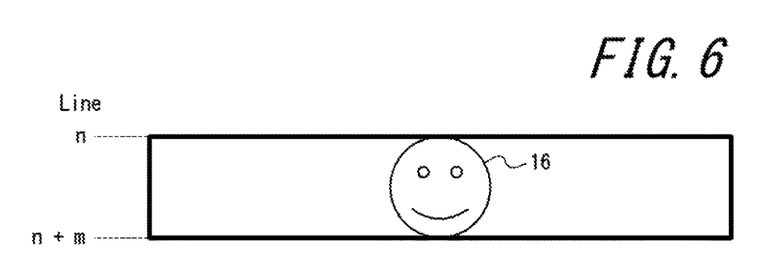
FIG. 6 is a diagram illustrating an example of an area extracted from the image in FIG. 5.

The imaging apparatus controller 25 may perform the aforementioned post-image processing and the object detection processing by using a captured image in a frame after frame P. As illustrated in FIG. 6, for example, the imaging apparatus controller 25 may extract the area on a captured image corresponding to the nth line to the n+mth line by the extraction processing included in the post-image processing. The imaging apparatus controller 25 may perform the object detection processing by using the extracted area. Alternatively, the imaging apparatus controller 25 may perform the object detection processing by using only the area corresponding from the nth line to the n+mth line on a captured image in the frame after frame P, without performing the extraction processing.

For example, when a posture of the target person 16 changes, eyes or pupils of the target person 16 may not be included in the area on a captured image corresponding to the one or more lines detected in the aforementioned manner. In this case, the imaging apparatus controller 25 may not be able to detect eyes or pupils of the target person 16 over the successive frames. When eyes or pupils of the target person 16 on the captured image are not detected over the successive first reference number of frames, the imaging apparatus controller 25 may generate the aforementioned first control information and transmit the information to the illumination apparatus 11. Any first reference number may be determined.

For example, when the target person 16 drives in an inattentive or dozing manner, the imaging apparatus controller 25 may not be able to detect eyes or pupils of the target person 16 on a captured image over the successive frames. The state where the target person 16 drives in an inattentive or dozing manner is also referred to as a specific state. When eyes or pupils of the target person 16 on a captured image are not detected over the successive second reference number of frames, the imaging apparatus controller 25 may determine that the target person 16 is in a specific state. The imaging apparatus controller 25 may generate the warning information that causes the warning apparatus 1 to give a warning and transmit the information to the warning apparatus 14. The second reference number may be any values larger than the first reference number. Operation of the warning apparatus 14 that receives the warning information is described later.

Figure 1:
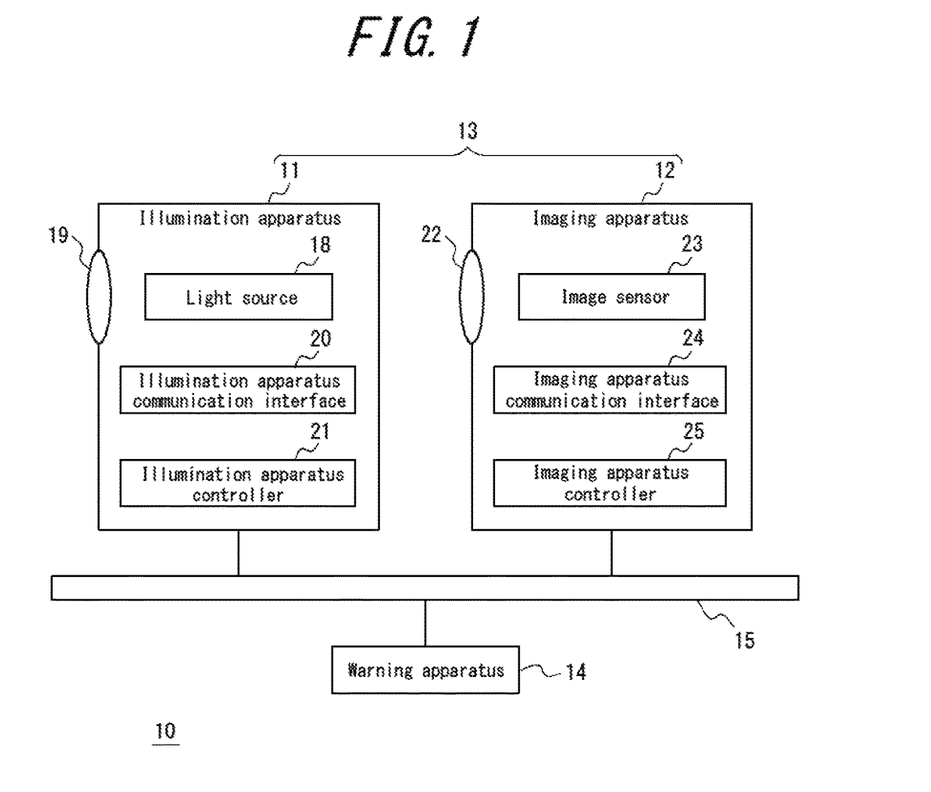
FIG. 1 is a block diagram illustrating a schematic configuration of a target person monitoring system according to an embodiment of this disclosure.

As illustrated in FIG. 1, the illumination apparatus 11 comprises one or more light sources 18, an illumination optical system 19, an illumination apparatus communication interface 20 and an illumination apparatus controller 21.

The light source 18 emits light of any wavelength band. For example, the light source 18 may emit infrared band light. The light source 18 may have or may not have directional characteristics. In an embodiment, the light source 18 may be Light Emitting Diode (LED).

The illumination optical system 19 irradiates the illumination light that is emitted by the light source 18 and transmits through the illumination optical system 19. For example, the illumination optical system 19 may include a lens with an adjusted angle of view. In an embodiment, the illumination light may be irradiated over the entire image capturing range of the imaging apparatus 12.

The illumination apparatus communication interface 20 is an interface that inputs and outputs the information over the network 15.

The illumination apparatus controller 21 includes one or more processors. The processor may include a dedicated processor specific to specific processing and a general purpose processor that reads specific program to execute a specific function. The dedicated processor may include ASIC. The processor may include PLD. PLD may include FPGA. The illumination apparatus controller 21 may be either SoC in which one or more processors corporate with each other or SiP.

The illumination apparatus controller 21 controls the entire operation of the illumination apparatus 11. For example, the illumination apparatus controller 21 controls the operation of the light source 18. The first operation control and the second operation control of the light source 18 performed by the illumination apparatus controller 21 will be specifically described below.

The illumination apparatus controller 21 receives the first control information from the imaging apparatus 12 and starts the first operation. In the first operation, the illumination apparatus controller 21 causes the light source 18 to emit light until it receives the second control information from the imaging apparatus 12. The illumination apparatus controller 21 may cause the light source 18 to emit light continuously or by pulse. The light emitted from the light source 18 may be bright enough for the imaging apparatus 12 to detect a detection object on a captured image by the object detection processing.

When receiving the second control information from the imaging apparatus 12, the illumination apparatus controller 21 ends the aforementioned first operation and starts the second operation. In the second operation, the illumination apparatus controller 21 causes the light source 18 to emit light in a specific period indicated in the second control signal until it receives the first control signal from the imaging apparatus 12. The illumination apparatus controller 21 causes the light source 18 to stop emitting light outside the specific period until it receives the first control signal from the imaging apparatus 12. The illumination light is irradiated only in a specific period in each frame during the second operation of the illumination apparatus controller 21. Thus, compared with the first operation in which the illumination light bright enough for the imaging apparatus 12 to perform the object detection processing is irradiated all the time, power consumed by the light source 18 is reduced. Compared with the first operation, power consumed by the light source 18 during the second operation is significantly reduced as the time d from the end of reading out of charge to the start of the next charge accumulation period increases in each line.

The warning apparatus 14 illustrated in FIG. 1 may comprise a speaker and a vibrator, for example. When acquiring the warning information from the imaging apparatus 12, the warning apparatus 14 gives a warning to the target person 16. A warning may be given by at least one of sound and vibration, for example. Hereinafter the warning apparatus 14 is also referred to as a warning unit.

Figure 7:
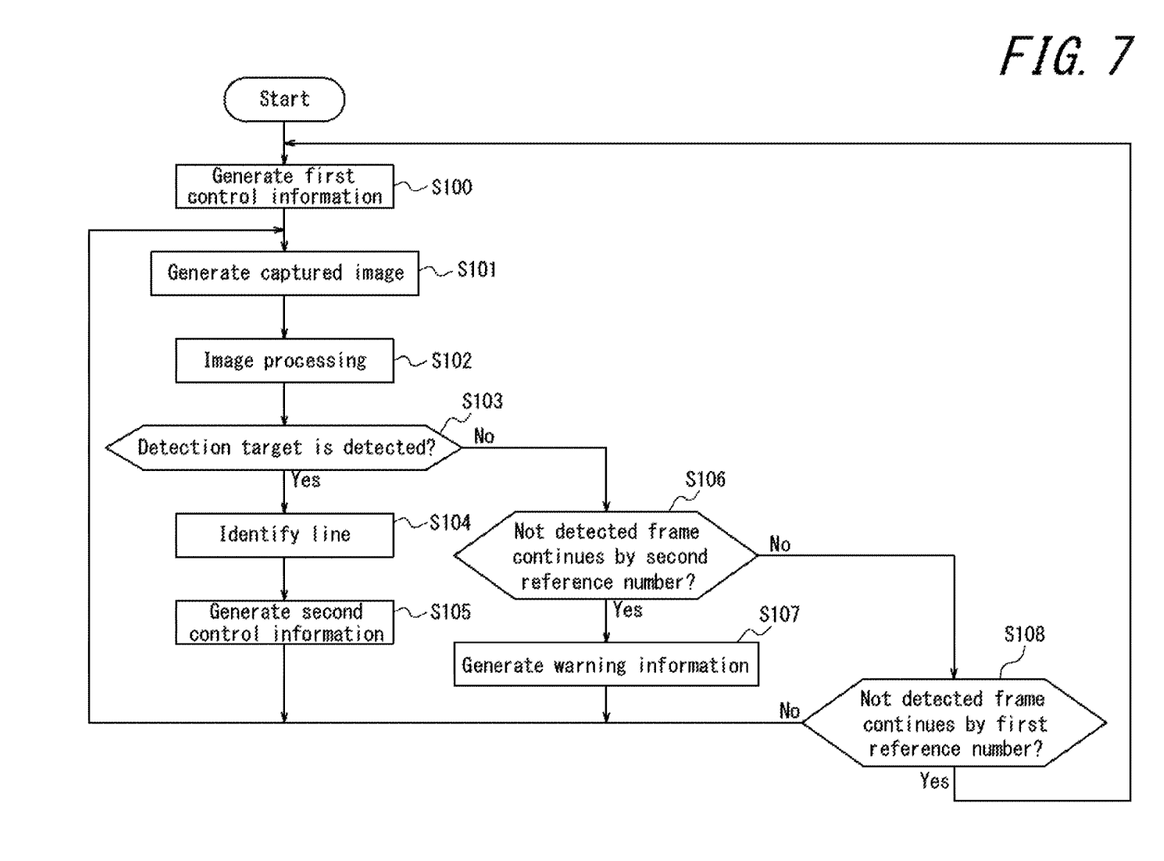
FIG. 7 is a flowchart illustrating an operation of an imaging apparatus.

Operation of the imaging apparatus 12 is described with reference to the flowchart in FIG. 7. This operation is started when the vehicle 17 starts traveling, for example, and may be repeated until a specific ending condition such as engine drive stop is met.

Step S100: The imaging apparatus controller 25 generates the first control information and transmits the information to the illumination apparatus 11. When receiving the first control information, the illumination apparatus 11 starts the first operation.

Step S101: The imaging apparatus controller 25 controls the operation of the image sensor 23 to generate an image of captured object. The image sensor 23 may apply a specific pre-image processing to the captured image generated.

Step S102: The imaging apparatus controller 25 applies a specific post-image processing to the captured image applied with the pre-image processing.

Step S103: Subsequently the imaging apparatus controller 25 performs the object detection processing by using the captured image applied with the post-image processing and detects a detection object. The detection object includes eyes or pupils of the target person 16. When a detection object is detected (Yes in step S103), process proceeds to step S104. When a detection object is not detected (No in step S103), process proceeds to step S106.

Step S104: When a detection object is detected in step S103 (Yes in step S103), the imaging apparatus controller 25 identifies one or more lines of the image sensor 23 corresponding to the area on the captured image that includes at least the detection object detected.

Step S105: The imaging apparatus controller 25 generates the second control information on the basis of the one or more lines identified and outputs the information to the illumination apparatus 11. When receiving the second control information, the illumination apparatus 11 starts the second operation. After that, the process returns to step S101.

Step S106: When a detection object is not detected in step S103 (No in step S103), the imaging apparatus controller 25 determines whether a frame in which a detection object is not detected continues by the second reference number or not. When it is determined that a frame in which a detection object is not detected continues by the second reference number (Yes in step S106), the process proceeds to step S107. When it is determined that a frame in which a detection object is not detected does not continue by the second reference number (No in step S106), the process proceeds to step S108.

Step S107: When it is determined that a frame in which a detection object is not detected continues by the second reference number in step S106 (Yes in step S106), the imaging apparatus controller 25 generates the warning information and outputs the information to the warning apparatus 14. After that, the process returns to step S101.

Step 108: When it is determined that a frame in which a detection object is not detected does not continue by the second reference number in step S106 (No in step S106), the imaging apparatus controller 25 determines whether the frame in which a detection object is not detected continues by the first reference number. As described above, the first reference number is smaller than the second reference number. When it is determined that the frame in which a detection object is not detected continues by the first reference number (Yes in step S108), the process returns to step S100. When it is determined that the frame in which a detection object is not detected does not continue by the first reference number (No in step S108), the process returns to step S101.

As described above, the imaging apparatus 12 according to this embodiment comprises an image sensor 23 configured to control charge accumulation and reading out in a plurality of pixels arranged in a two-dimensional array per line. The imaging apparatus 12 comprises the imaging apparatus controller 25 configured to identify one or more lines from a plurality of lines of the image sensor 23 to generate the second control information for controlling the illumination light on the basis of the identified one or more lines. Such configuration allows for illumination light control associated with a desired line of a plurality of lines of the image sensor 23, and thus the power consumed by the light source 18 can be reduced.

The imaging apparatus controller 25 may detect a detection object on a captured image and generate the first control information on the basis of one or more lines of the image sensor 23 corresponding to the area on the captured image that includes a detection object detected. Such configuration allows for control of illumination light associated with a line corresponding to an area on a captured image that is highly probable to include a detection object.

The second control information may include an instruction for stopping emission of illumination light outside a specific period determined on the basis of one or more lines identified. Such configuration allows for stopping irradiation of illumination light outside the specific period. Thus, compared with the configuration by which illumination light is irradiated all the time, for example, power consumed by the light source 18 is reduced.

The imaging apparatus controller 25 may determine at least a part of a period from the first timing to the second timing in a frame after the frame of a captured image used for the object detection processing as a specific period. The first timing is the latest one of the start timings of charge accumulation of the identified one or more lines. The second timing is the earliest one of the end timings of charge accumulation of the identified one or more lines. In such configuration, a period included in common in each charge accumulation period of each of the identified one or more lines is determined as a specific period. Emission of illumination light is stopped outside a specific period, and thus an area on a captured image corresponding to the identified at least one or more lines of the area on the captured image has uniform brightness.

The imaging apparatus controller 25 may generate the first control information when a detection object on a captured image is not detected over the successive first reference number of frames. The first control information allows for emission of illumination light in and outside the specific period. In other words, the first control information allows for emission of illumination light all the time. Such configuration allows for irradiation of illumination light over the entire period of one frame, thus uniform brightness is obtained over the entire area on the captured image. Thus, even if the position of the detection object changes on the captured image of the detection object, the probability of detection of the detection object is increased.

The imaging apparatus 12 performs the object detection processing by using an area corresponding to the identified one or more lines on the captured image acquired from the image sensor 23 after generating the second control information. As described above, the area on the captured image corresponding to the identified one or more lines is an area that is highly probably to include a detection object. Thus, according to the aforementioned configuration by which the object detection processing is performed by using the area, for example, compared with the configuration by which the object detection processing is performed by using the entire area on the captured image, processing load of the object detection processing is reduced.

The imaging apparatus 12 generates the warning information to give a warning to the target person 16 on the basis of the detection results of the target person 16 on a captured image. Such configuration allows for giving a warning when it is highly probable that the target person 16 drives in an inattentive or a dozing manner, for example, and thus safety of driving of the vehicle 17 by the target person 16 is enhanced.

Although this disclosure has been described with reference to the accompanying drawings and embodiments, it is to be noted that various changes and modifications will be apparent to those skilled in the art based on this disclosure. Therefore, such changes and modifications are to be understood as included within the scope of this disclosure. For example, the functions and the like included in the members, units, steps, and the like may be reordered in any logically consistent way. Furthermore, units, steps, and the like may be combined into one or divided.

A part of the components of the target person monitoring system 10 according to the aforementioned embodiments may be temporarily disposed in the vehicle 17. For example, the illumination apparatus 11, the imaging apparatus 12, the warning apparatus 14 and the like may be provided as a communication device such as a mobile phone, and may be connected wired or wirelessly with the other components of the target person monitoring system 10.

In the aforementioned embodiments, a description has been given about the configuration of mounting the target person monitoring system 10 on the vehicle 17. However, the target person monitoring system 10 may be mounted not only on the vehicle 17 but also on various kinds of moving body. The "moving body" in this disclosure may include, for example, vehicles, ships, aircrafts and the like. Vehicles may include, for example, automobiles, industrial vehicles, rail vehicles, campers, fixed-wing airplanes running on runway, and the like. Automobiles may include, for example, passenger cars, trucks, buses, two-wheel vehicles, trolleybuses and the like. Industrial vehicles may include, for example, agricultural and construction industrial vehicles and the like. Industrial vehicles may include, for example, forklifts, golf carts, and the like. Agricultural industrial vehicles may include, for example, tractors, tillers, transplanters, binders, combines, lawn mowers and the like. Construction industrial vehicles may include, for example, bulldozers, scrapers, loading shovels, crane vehicles, dump trucks, road rollers and the like. Vehicles may include human-powered vehicles. Vehicle classification is not limited to the aforementioned examples. For example, automobiles may include industrial vehicles that can travel on the road. Same vehicle may be included in some categories. Ships may include, for example, jet ski bikes, boats, tankers and the like. Aircrafts may include, for example, fixed-wing airplanes, rotor-wing airplanes and the like.

The invention claimed is:

1. An imaging apparatus comprising:
    an image sensor in which a plurality of pixels are arranged in a two-dimensional array with a plurality of lines, and wherein charge accumulation and reading out of the plurality of lines are controlled per line; and
    a controller configured to,
    in a first mode, control illumination light to illuminate a target area during a charge accumulation period for all of the plurality of lines in a first frame,
    generate a first captured image of the first frame,
    perform object detection on the first captured image,
    in response to detecting an object, switch to a second mode,
    in the second mode,
        identify one or more lines from the plurality of lines of the image sensor that correspond to a location of the detected object in the first captured image,
        for each of one or more second frames,
            control the illumination light to illuminate the target area during a portion of the charge accumulation period for only the identified one or more lines in the second frame,
            generate a second captured image of the second frame, and
            perform object detection on the second captured image, and,
        when the object is not detected for a first reference number of consecutive second frames, switch back to the first mode, and,
    when the object is not detected for a second reference number of consecutive first or second frames, initiate a warning,
    wherein the second reference number is greater than the first reference number.

2. The imaging apparatus according to claim 1, wherein controlling the illumination light to illuminate the target area during the portion of the charge accumulation period for only the identified one or more lines in the second frame comprises generating control information for an illumination system, wherein the control information includes an instruction for stopping emission of the illumination light outside a specific period determined on the basis of the identified one or more lines.

3. The imaging apparatus according to claim 2, wherein the specific period is defined by a start time and an end time within the charge accumulation period for the identified one or more lines in the second frame, wherein the start time a latest timing of start timings of charge accumulation in the identified one or more lines, and the end time is an end timing that is an earliest timing of end timings of charge accumulation in the identified one or more lines.

4. The imaging apparatus according to claim 1, wherein the controller performs the object detection only in an area of the second captured image corresponding to the identified one or more lines.

5. An imaging system comprising:
    the imaging apparatus of claim 1; and
    one or more light sources configured to emit the illumination light.

6. A target person monitoring system comprising:
    the imaging system of claim 5, wherein the controller is configured to determine a state of a target person on the basis of the detected object; and
    a warning system configured to give a warning to the target person when the target person is determined to be in a specific state.

7. A control method of an imaging apparatus comprising an image sensor in which a plurality of pixels are arranged in a two-dimensional array with a plurality of lines, and wherein charge accumulation and reading out of the plurality of lines are controlled per line, the method comprising:
    in a first mode, controlling illumination light to illuminate a target area during a charge accumulation period for all of the plurality of lines in a first frame;
    generating a first captured image of the first frame;
    performing object detection on the first captured image;
    in response to detecting an object, switching to a second mode;
    in the second mode,
    identifying one or more lines from the plurality of lines of the image sensor that correspond to a location of the detected object in the first captured image,
    for each of one or more second frames,
        control the illumination light to illuminate the target area during a portion of the charge accumulation period for only the identified one or more lines in the second frame,
        generate a second captured image of the second frame, and
        perform object detection on the second captured image, and,
    when the object is not detected for a first reference number of consecutive second frames, switch back to the first mode; and,
    when the object is not detected for a second reference number of consecutive first or second frames, initiate a warning,
    wherein the second reference number is greater than the first reference number.

* * * * *